US012656214B2

(12) United States Patent
Mizrahi et al.

(10) Patent No.: US 12,656,214 B2
(45) **Date of Patent: \*Jun. 16, 2026**

(54) AUTOMATED TESTING OF OPTICAL ASSEMBLIES

(71) Applicant: IonQ, Inc., College Park, MD (US)

(72) Inventors: Jonathan Albert Mizrahi, Silver Spring, MD (US); Kai Hudek, Hyattsville, MD (US)

(73) Assignee: IonQ, Inc., College Park, MD (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/629,571

(22) Filed: Apr. 8, 2024

(65) Prior Publication Data

US 2024/0344926 A1    Oct. 17, 2024

Related U.S. Application Data

(63) Continuation of application No. 16/725,605, filed on Dec. 23, 2019, now Pat. No. 11,971,322.

(60) Provisional application No. 62/785,879, filed on Dec. 28, 2018.

(51) Int. Cl.
*G01M 11/02* (2006.01)

(52) U.S. Cl.
CPC .............................. *G01M 11/0207* (2013.01)

(58) Field of Classification Search
CPC ........................ G01M 11/0207; G01M 11/005
See application file for complete search history.

(56) References Cited

U.S. PATENT DOCUMENTS

| | | | |
|---|---|---|---|
| 4,840,450 A | 6/1989 | Jones et al. | |
| 5,153,675 A | 10/1992 | Beauchaine | |
| 5,237,404 A | 8/1993 | Tanaka et al. | |
| 5,825,558 A | 10/1998 | Farmiga et al. | |
| 5,828,502 A | 10/1998 | Afshari | |
| 5,855,074 A | * 1/1999 | Abitbol ................ | G01B 11/255 |
| | | | 33/507 |
| 6,163,417 A | 12/2000 | Nunnally | |
| 7,302,136 B2 | 11/2007 | Vakhshoori et al. | |
| 7,319,516 B2 | 1/2008 | Aubanel et al. | |
| 8,172,412 B2 | 5/2012 | Solyar et al. | |
| 8,400,623 B2 | 3/2013 | Kasturi et al. | |
| 8,651,447 B2 | 2/2014 | Ryaboy et al. | |
| 9,678,300 B2 | 6/2017 | Nguyen et al. | |

(Continued)

*Primary Examiner* — Tarifur R Chowdhury
*Assistant Examiner* — Carlos Perez-Guzman
(74) *Attorney, Agent, or Firm* — ARENTFOX SCHIFF LLP

(57) ABSTRACT

The disclosure describes various aspects of different for automated testing of optical assemblies. A system is described that includes an arm (e.g., a motorized arm) configured to be positioned over an optical assembly having a base plate with multiple optical elements that form one or more optical beam paths. The system also includes at least one optical tool that is configured to be removably attached to the arm and has a measurement instrument to perform a specified test on at least one of the optical beam paths. The arm is configured to adjust its position over the optical assembly to move the optical tool to the correct place to perform the specified test. The system may also include an optical tool changer configured to hold the optical tool in a tool holder when not attached to the arm and to hold additional optical tools in respective tool holders.

18 Claims, 13 Drawing Sheets

(56)         References Cited

U.S. PATENT DOCUMENTS

| | | | |
|---|---|---|---|
| 11,513,314 | B2 | 11/2022 | Suchowski |
| 2002/0120359 | A1 | 8/2002 | Xi et al. |
| 2004/0165285 | A1 | 8/2004 | Galpin |
| 2004/0204909 | A1 | 10/2004 | Abitan et al. |
| 2004/0240805 | A1 | 12/2004 | Vakhshoori et al. |
| 2005/0137829 | A1 | 6/2005 | Gimelfarb et al. |
| 2010/0039270 | A1* | 2/2010 | Lin .................... G01M 11/0207 |
| | | | 356/124 |
| 2012/0057146 | A1* | 3/2012 | Cho ..................... G01N 21/553 |
| | | | 356/369 |
| 2012/0197438 | A1* | 8/2012 | Ogami ................... B25J 9/1682 |
| | | | 901/46 |
| 2015/0253125 | A1 | 9/2015 | Pettersson |
| 2016/0363534 | A1 | 12/2016 | Hagen et al. |
| 2018/0143245 | A1* | 5/2018 | Saadany ................ G01R 1/071 |
| 2020/0011995 | A1* | 1/2020 | Send ....................... G01S 3/783 |
| 2022/0048192 | A1 | 2/2022 | Meyer-Delius Di Vasto |

* cited by examiner

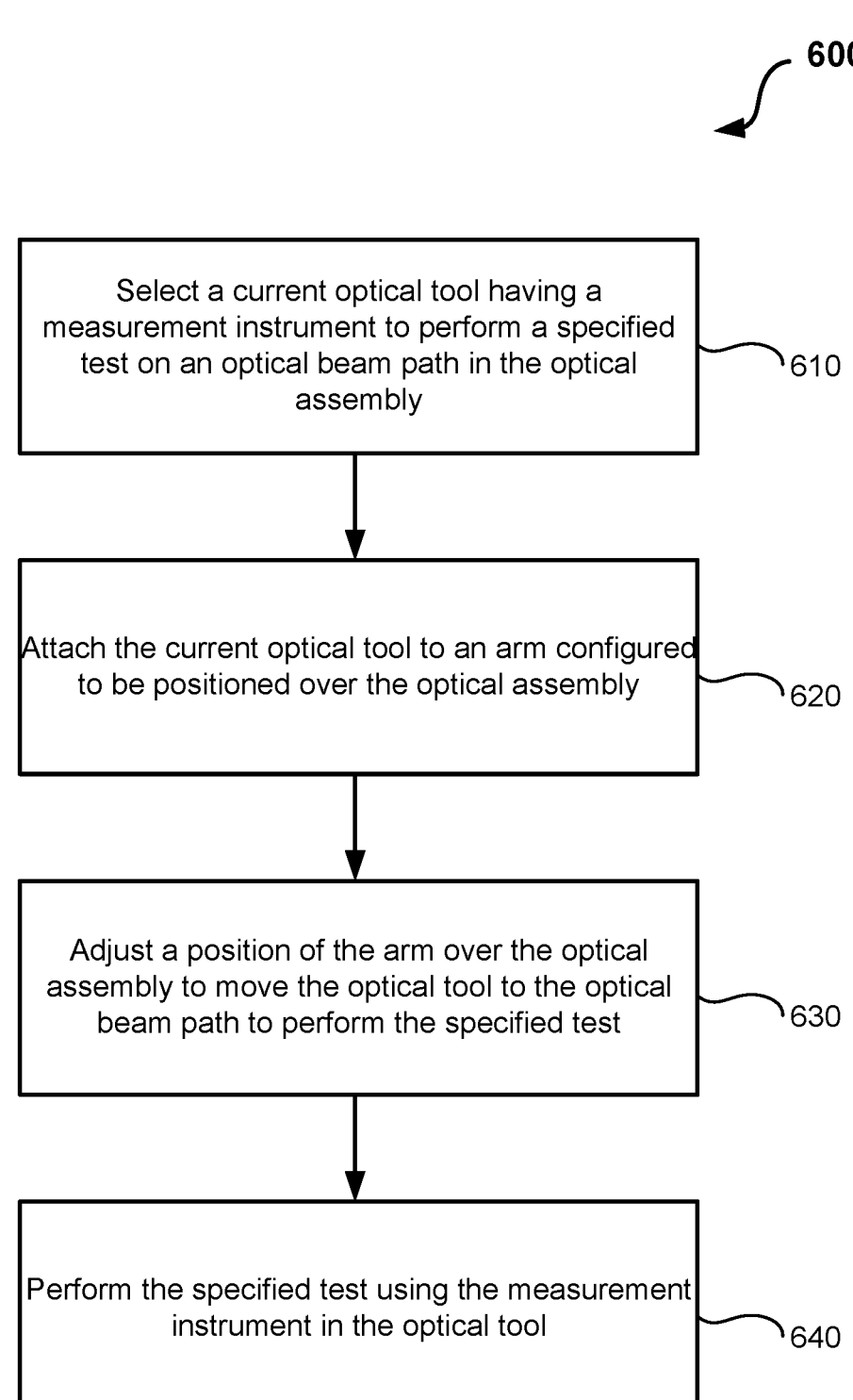

600

Select a current optical tool having a measurement instrument to perform a specified test on an optical beam path in the optical assembly

610

Attach the current optical tool to an arm configured to be positioned over the optical assembly

620

Adjust a position of the arm over the optical assembly to move the optical tool to the optical beam path to perform the specified test

630

Perform the specified test using the measurement instrument in the optical tool

AUTOMATED TESTING OF OPTICAL ASSEMBLIES

CROSS REFERENCE TO RELATED APPLICATIONS

The present application is a continuation of U.S. patent application Ser. No. 16/725,605 filed Dec. 23, 2019, and entitled: AUTOMATED TESTING OF OPTICAL ASSEMBLIES, which claims priority to and the benefit from U.S. Provisional Patent Application No. 62/785,879, entitled "AUTOMATED TESTING OF OPTICAL ASSEMBLIES," and filed Dec. 28, 2018, the contents of each of which are incorporated herein by reference in their entirety.

BACKGROUND OF THE DISCLOSURE

Aspects of the present disclosure generally relate to optical assemblies, and more specifically, to the testing of optical assemblies as part of the process of assembling or manufacturing the optical assemblies.

Large optical assemblies, such as the ones used in some types of quantum information processing (QIP) systems (e.g., trapped ion-based QIP systems) have a significant number of components in complex configurations that can result in multiple optical beam paths and/or optical beam path segments. These optical assemblies typically require extensive testing while they are being constructed or assembled, or after their construction or assembly, to ensure that they meet very precise design and operational tolerances and requirements.

Some of the testing or measurements that are typically performed include, but are not limited to, optical beam power, optical beam transverse profile, optical beam positioning, optical beam wave properties, and/or optical beam polarization. These measurements generally require different instrumentation and a person would normally insert the appropriate instrument into an optical beam path at different locations (e.g., at different segments or locations of the optical beam path) and manually record the measurement results. As expected, such an approach can be not only cumbersome but also unreliable and difficult to reproduce in a highly repeatable manner.

Accordingly, techniques that can enable for the precise, reliable, fast, and repeatable testing of complex optical assemblies is desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, various techniques are described for testing and characterizing optical assemblies during assembly or manufacturing by performing one or more automated measurements using different instruments.

In an aspect of the disclosure, a system for automated characterization of an optical assembly includes an arm configured to be positioned over the optical assembly, the optical assembly having a base plate with multiple optical elements that form one or more optical beam paths, and an optical tool configured to be removably attached to the arm, the optical tool including a measurement instrument to perform a specified test on at least one of the one or more optical beam paths in the optical assembly, and the arm being configured to adjust its position over the optical assembly to move the optical tool to the correct place to perform the specified test.

In another aspect of the disclosure, a method for automated characterization of an optical assembly includes selecting a current optical tool having a measurement instrument to perform a specified test on an optical beam path in the optical assembly, attaching the current optical tool to an arm configured to be positioned over the optical assembly, adjusting a position of the arm over the optical assembly to move the optical tool to the optical beam path to perform the specified test; and performing the specified test using the measurement instrument in the optical tool.

Each of the aspects described above can be implemented for the testing and characterizing of optical assemblies used in different types of optical or photonic systems, including quantum information processing (QIP) systems or similar systems.

BRIEF DESCRIPTION OF THE DRAWINGS

The appended drawings illustrate only some implementation and are therefore not to be considered limiting of scope.

FIG. 6 is a flow chart that illustrates an example of a method for automated characterization of an optical assembly, in accordance with aspects of the disclosure.

DETAILED DESCRIPTION

Figure 1A:
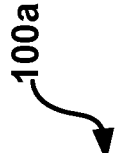
FIG. 1A illustrates a top view of an example of an optical assembly, in accordance with aspects of the disclosure.
Figure 1A:
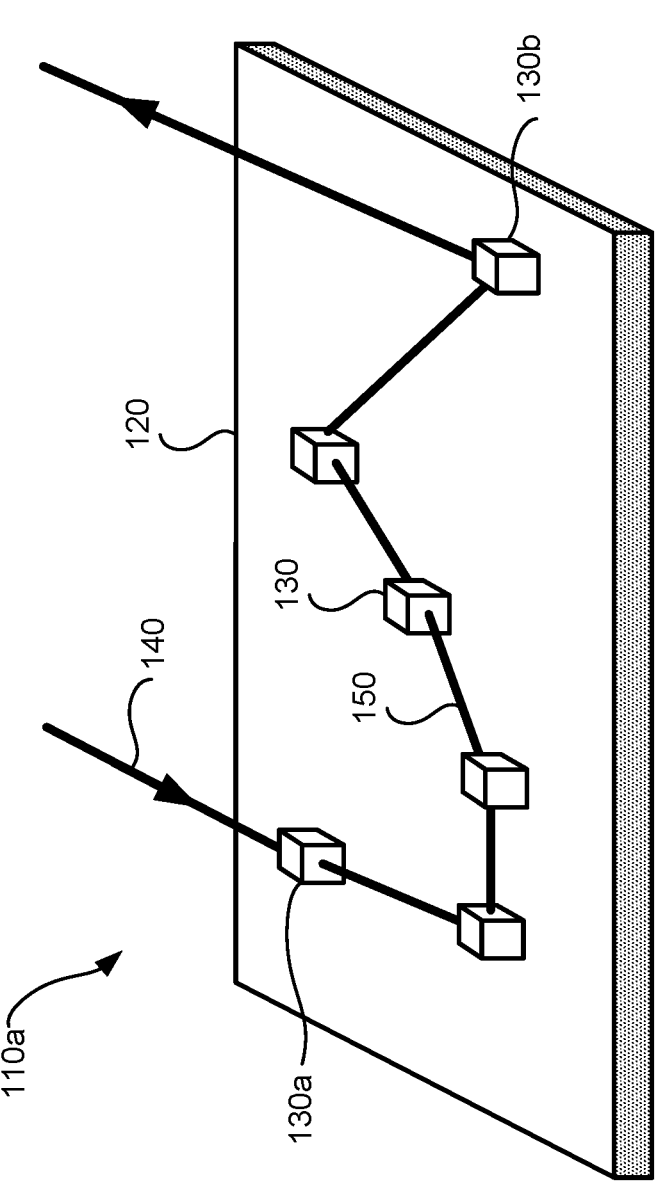

Reference will now be made in detail to example aspects of implementations, examples of which are illustrated in the accompanying figures. The following description refers to the accompanying figures in which the same numbers in different figures represent the same or similar elements unless otherwise represented. The implementations set forth in the following description do not represent all implementations consistent with the disclosure. Instead, they are merely examples of structures and/or processes consistent with aspects of implementations related to the disclosure as recited in the claims. For example, although some aspects of the disclosure are described in the context of characterizing optical assemblies used in connection with optical or photonic operations of quantum systems, these aspects may also be applicable to other types of optical assemblies not associated with quantum computations. As used in this disclosure the terms "test" and "characterization" may be used interchangeably to refer to obtaining experimental data to assess certain characteristics, physical and/or operational, of an optical assembly.

As mentioned above, optical assemblies typically require extensive testing while they are being constructed or assembled, or after construction or assembly, to ensure that they meet very precise design and operational tolerances and requirements. Performing the testing manually is not only cumbersome and time consuming, but highly unreliable and unrepeatable, which does not provide the level of assurance needed for many complex optical assemblies such as those used in quantum systems.

Among the tests that are generally performed are optical beam power measurements at different points along an optical beam path, where an optical power meter is used to characterize system losses and optimize efficiencies (e.g., fiber coupling, acousto-optic modulator (AOM) diffraction). Other tests include optical beam transverse profile, which is measured with a camera (e.g., a CCD camera) as a beam profiler or with a rotating slit detector, optical beam positioning, which is also measured with a camera (e.g., CCD camera) in relation to other measurement points or datum, optical beam wave (e.g., Gaussian) properties, which include but are not limited to divergence and waist location and are measured by sampling the optical beam with a beam profiler at points along a propagation direction of the optical beam, and beam polarization, which is measured by inserting polarizing optics (e.g., waveplates, polarizing beam splitters) in an optical beam line and then measuring the power transmitted/reflected as the polarization is varied. For some tests, such as for optical beam profiling or positioning, a position-sensitive photodetector may be used instead of a camera.

In order to perform these and other tests more efficiently, the present disclosure proposes an automated system (e.g., an automated testing system) into which an optical assembly can be inserted or one which can be placed over an existing optical assembly to perform one or more specified tests. FIGS. 1A-1D below describe various aspects of the optical assemblies under consideration for such an automated system.

FIG. 1A shows a diagram 100a that illustrates a top view of an optical assembly 110a. The optical assembly 110a is provided by way of example and is not intended to be limited. The optical assembly 110a includes a base plate 120 on which multiple optical components or elements 130 are placed. The placement and alignment of the optical elements 130 on the base plate 120 are critical to ensure that the optical assembly 110a is properly constructed or assembled to be used as intended. The optical elements 130 can include passive devices (e.g., lenses, mirrors) as well as active devices (e.g., acousto-optic modulators (AOMs)). The arrangement of configuration of the optical elements 130 forms an overall optical beam path 140 that an optical beam (e.g., a laser beam) may travel as it passes from one optical element 130 to the next. In the example shown in the diagram 100a, the optical beam path 140 begins with an optical beam entering the optical assembly 110a to the left of the optical assembly 110a by first reaching optical element 130a and exits the optical assembly 110a to the right of the optical assembly 110a from optical element 130b. The portions of the optical beam path 140 between adjacent optical elements 130 may be referred to a segment 150, where the optical path 140 may include multiple segments 150.

During testing of the optical assembly 110a, multiples tests may be performed on the optical beam path 140, whether on the same segment 150 and/or on different segments 150, to characterize the overall performance of the optical assembly 110a. One or more of the optical elements 130 may need to be adjusted (e.g., position, alignment, or other controllable features) as a result of the measurements performed during the testing of the optical assembly 110a.

Figure 1B:
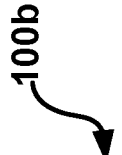
FIG. 1B illustrates a top view of an example of another optical assembly, in accordance with aspects of the disclosure.
Figure 1B:
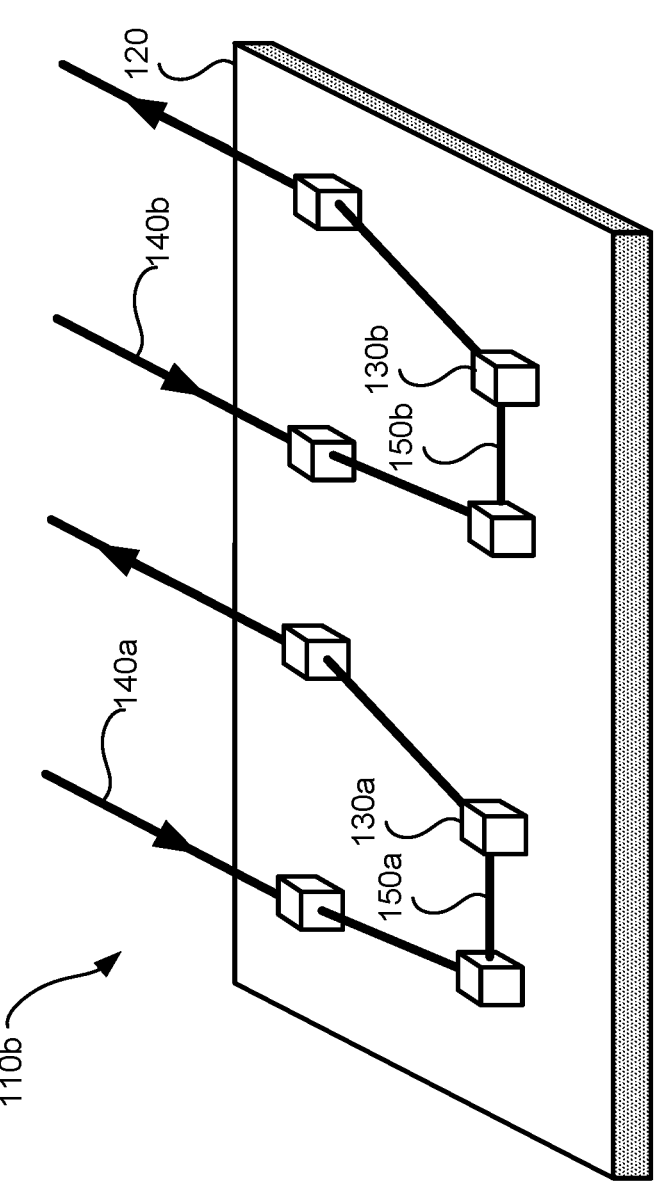

FIG. 1B shows a diagram 100b that illustrates a top view of a different optical assembly 110b. The optical assembly 110b includes a first optical beam path 140a made from multiple optical elements 130a (and forming one or more segments 150a) and a second optical beam path 140b made from multiple optical elements 130b (and forming one or more segments 150b). The first optical beam path 140a and the second optical beam path 140b may be similar or different, and may be tested separately. In an implementation, using the automated system described herein, the testing of the first optical beam path 140a and the second optical beam path 140b may be performed sequentially or concurrently.

The optical assemblies 110a and 110b are provided by way of example and are not intended to be limited. Optical assemblies can be very complex and include tens or even hundreds of optical components intricately arranged. Moreover, in complex optical assemblies there may be instances in which a single optical beam path may split into many different optical beam paths and, conversely, multiple optical beams may converge into a single optical beam path. Accordingly, the simplified examples provided herein are not intended to narrow the scope to which the teachings of this disclosure may apply.

Figure 1C:
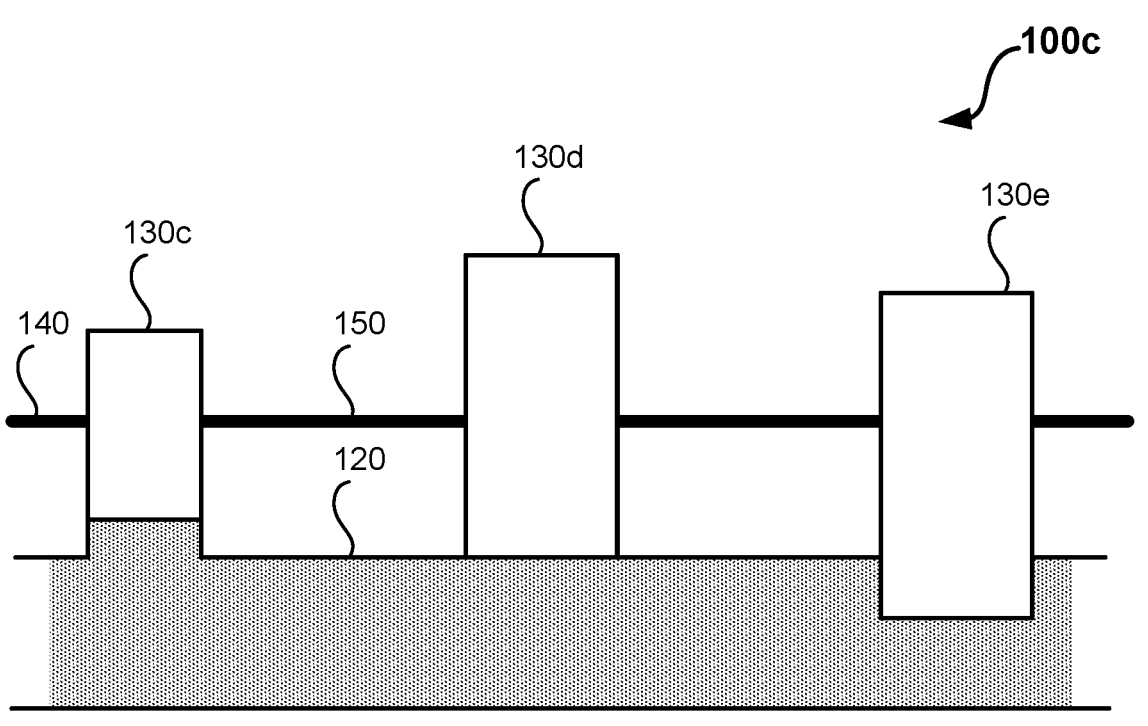
FIG. 1C illustrates a partial side view of an example of an optical assembly, in accordance with aspects of the disclosure.

FIG. 1C shows a diagram 100c illustrating a partial side view of an optical assembly, such as the optical assembly 110a or the optical assembly 110b in the diagrams 110a and 100b described above. In this example, the base plate 120 can be configured to have the different optical elements 130 (e.g., optical elements 130c, 130d, and 130e) mounted in different locations and aligned with each other to form the appropriate optical beam path 140 such that the appropriate optical operations are performed on an optical beam passing through the optical beam path 140. In some implementations, the base plate 120 can be flat, while in other implementation, as shown in the diagram 100c, the base plate 120 can be machined or otherwise configured such that the optical elements 130 are not all at the same level. Overall, the optical elements 130 are arranged on the base plate 120 in a way that facilitates or enables the alignment, positioning, and fitting of the optical elements 130. The position of the input and the output of the optical beam path 140 may play a role in how the optical elements 130 are arranged.

Figure 1D:
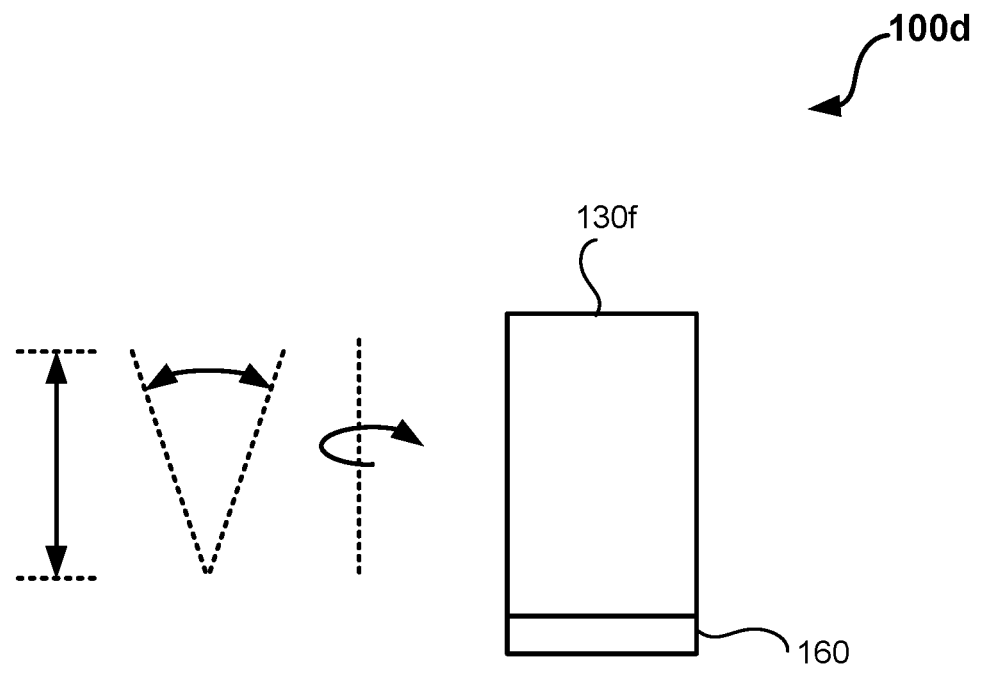
FIG. 1D illustrates an example of the various degrees of freedom of an optical component in an optical assembly, in accordance with aspects of the disclosure.

FIG. 1D shows a diagram 100d that illustrates the various degrees of freedom of an optical element 130 in an optical assembly. An optical element 130 can be fixed, that is, once it is placed on the base plate 120 it remains in its current position and alignment unless the it is manually adjusted or change. Other optical elements 130, however, can be electrically and/or mechanically adjusted after being placed on the base plate 120. In the diagram 100*d*, an optical element 130*f* can have a mechanical or electromechanical component 160 that allows for adjustment after placement. In some implementations, the component 160 can be controlled by an electrical signal to adjust its position and alignment. For example, as shown in the diagram 100*d*, the optical element 130*f* can be adjusted up and down within a certain range, can be tilted within a certain range, and/or can be rotated within a certain range (e.g., 0-360 degrees or less).

Figure 5:
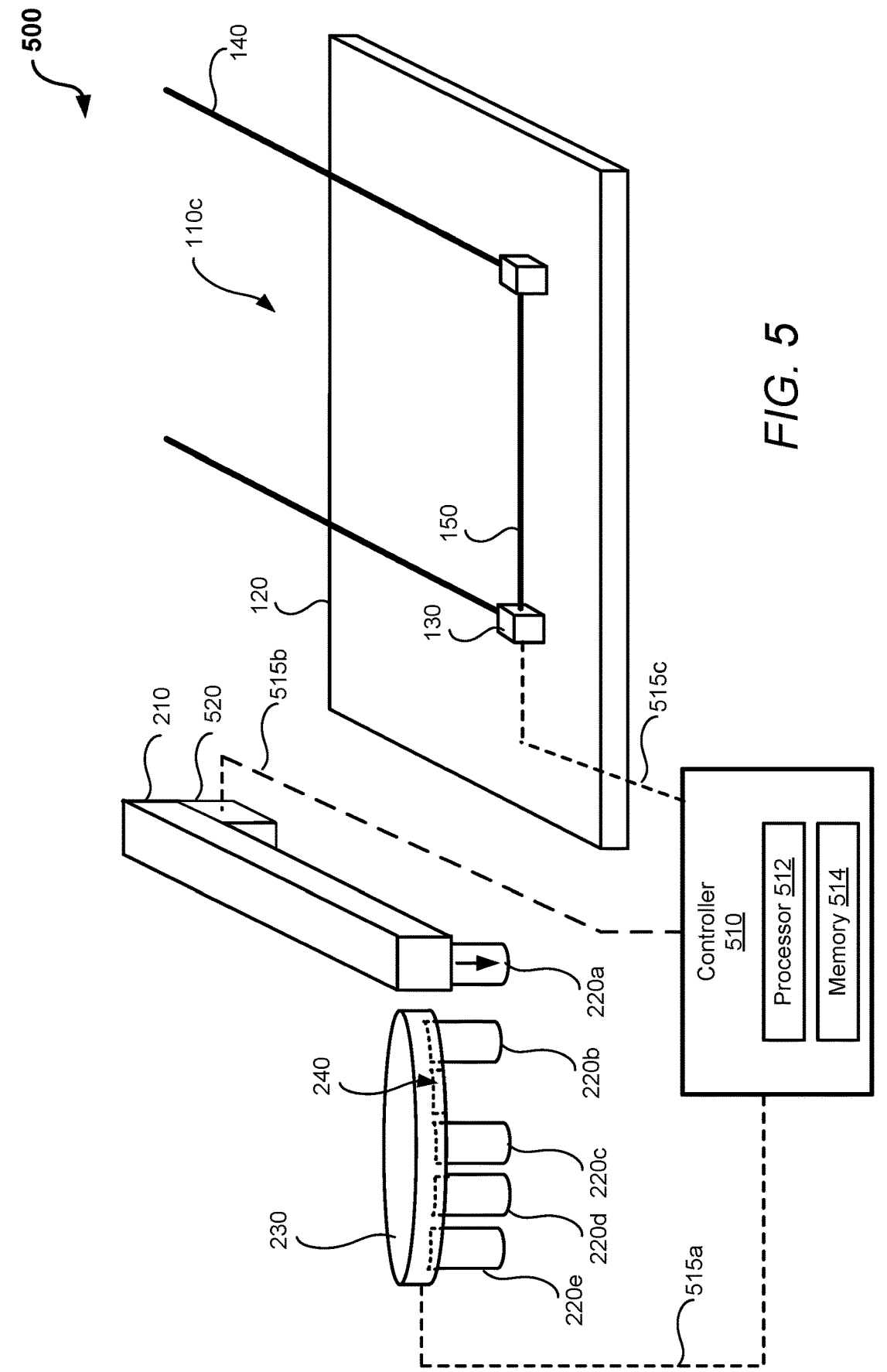
FIG. 5 illustrates an example of a controller used in an automated system for testing an optical assembly, in accordance with aspects of the disclosure.

In an aspect of this disclosure, after testing or measurements performed by an automated testing system, one or more optical elements 130 can be adjusted manually and/or electrically (e.g., using control signals) in response to the results of the testing or measurements (see e.g., FIG. 5).

The present disclosure proposes a machine or system (e.g., an automated testing system) into which an optical assembly (e.g., the optical assemblies 110*a* and 110*b*) could be inserted, or which could be placed above an existing optical assembly. The machine or system would have a full degree-of-freedom (DOF) motorized tool arm to manipulate an optical tool (e.g., a measurement, test, or metrology tool) and place it anywhere in the optical assembly, specifically, but not limited to, the optical beam path to perform specified tests. The full DOF of the motorized tool may include movement along X, Y, and Z directions as well as angular rotations about $\theta_x$, $\theta_y$, and $\theta_z$. That is, the motorized tool can move in up to six degrees-of-freedom by being able to be moved in up to three different directions and rotated in up to three different angles. More details regarding the motorized tool arm and the use of optical tools are provided below in connection with FIGS. 2A-3C.

In the proposed system, the optical tools can have well defined interfaces, such as a tool changer and optical system interfaces, around which the test points and procedures for making the tests or measurements at the test points could be designed. As such, the proposed system can include a tool changer (see e.g., FIG. 2B), to allow the system to change to different optical tools in an automated fashion.

By having access to a computer-aided design (CAD) model of the optical assembly, users of the proposed system would be able to specify the coordinates of the points in the optical assembly at which they wish to measure a given property or characteristic of an optical beam. The CAD model provides a three-dimensional mapping or topography of the optical assembly, including the desired position and alignment of the various optical elements to be placed on the optical assembly. The system can then register to a defined origin or registration mark on the optical assembly, so that coordinates in the CAD model match those on the system. The system would then automatically position the appropriate tool at the specified test point in the optical beam path, perform the specified test, and record the results.

In another implementation, one which can decrease the interface size of the tools and thus increasing versatility, the system and the optical tools can be configured to allow insertion of redirection (and possibly relay) optics to direct an optical beam vertically (e.g., out of plane of the optical assembly) for easier access to the test points. The optical tool could then be positioned further from the optical assembly, rather than in the line of the optical beam (e.g., the optical beam path).

Figure 2A:
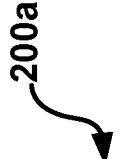
FIG. 2A illustrates an example of a motorized arm used in an automated system for testing an optical assembly, in accordance with aspects of the disclosure.
Figure 2A:
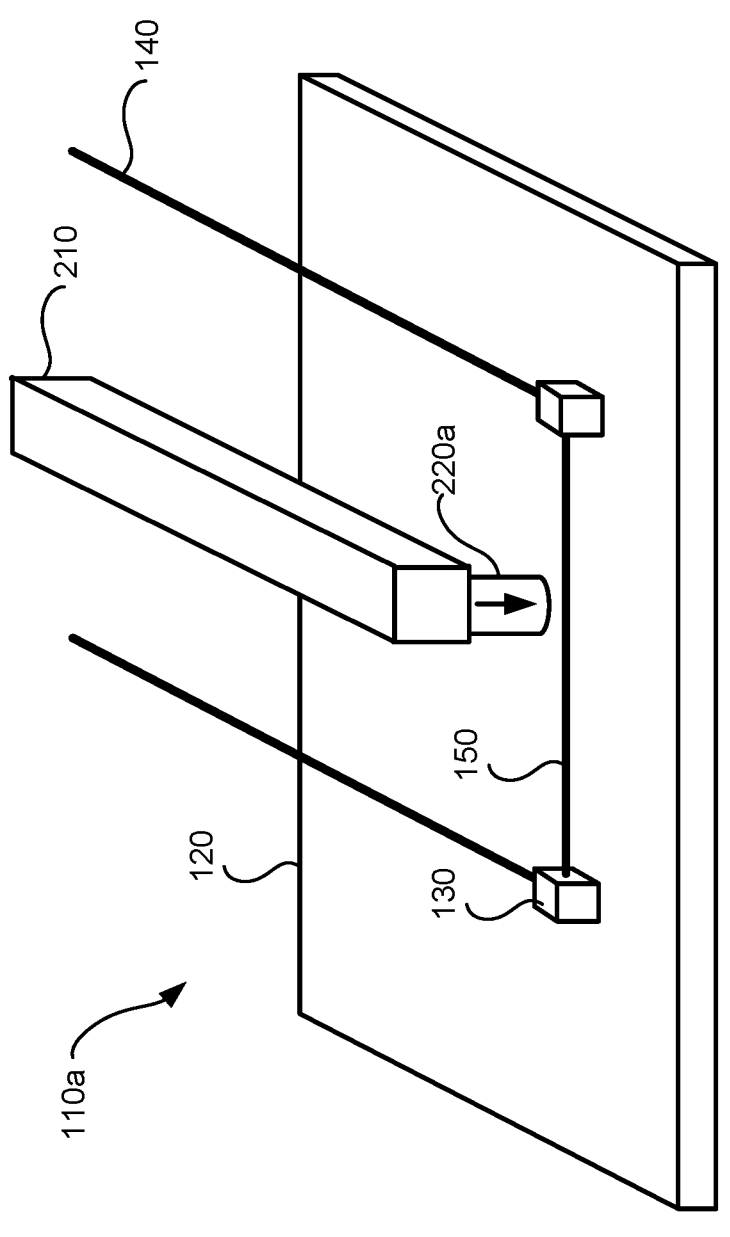

FIG. 2A shows a diagram 200*a* that illustrates a motorized arm 210 used in an automated testing system for testing an optical assembly, in accordance with aspects of the disclosure. The motorized arm 210, also referred to as a tool arm or more simply just an arm, can have an optical tool 220*a* attached to one end and then have the optical tool 220*a* lowered down (e.g., downward arrow) to the optical plane of the optical assembly 110*a* to perform as specified test on a particular position or testing point along the optical beam path 140. In this simple example, the optical tool 220*a* is lowered to characterize one or more properties of an optical beam passing through a segment (e.g., the segment 150) of the optical beam path 140.

Although the arm 210 is shown as an elongated, rectangular arm, the present disclosure need not be so limited and the arm 210 can have different shapes, sizes, and/or configurations that let it carry an optical tool and place it in the appropriate location to make a specified test on an optical assembly.

Figure 2B:
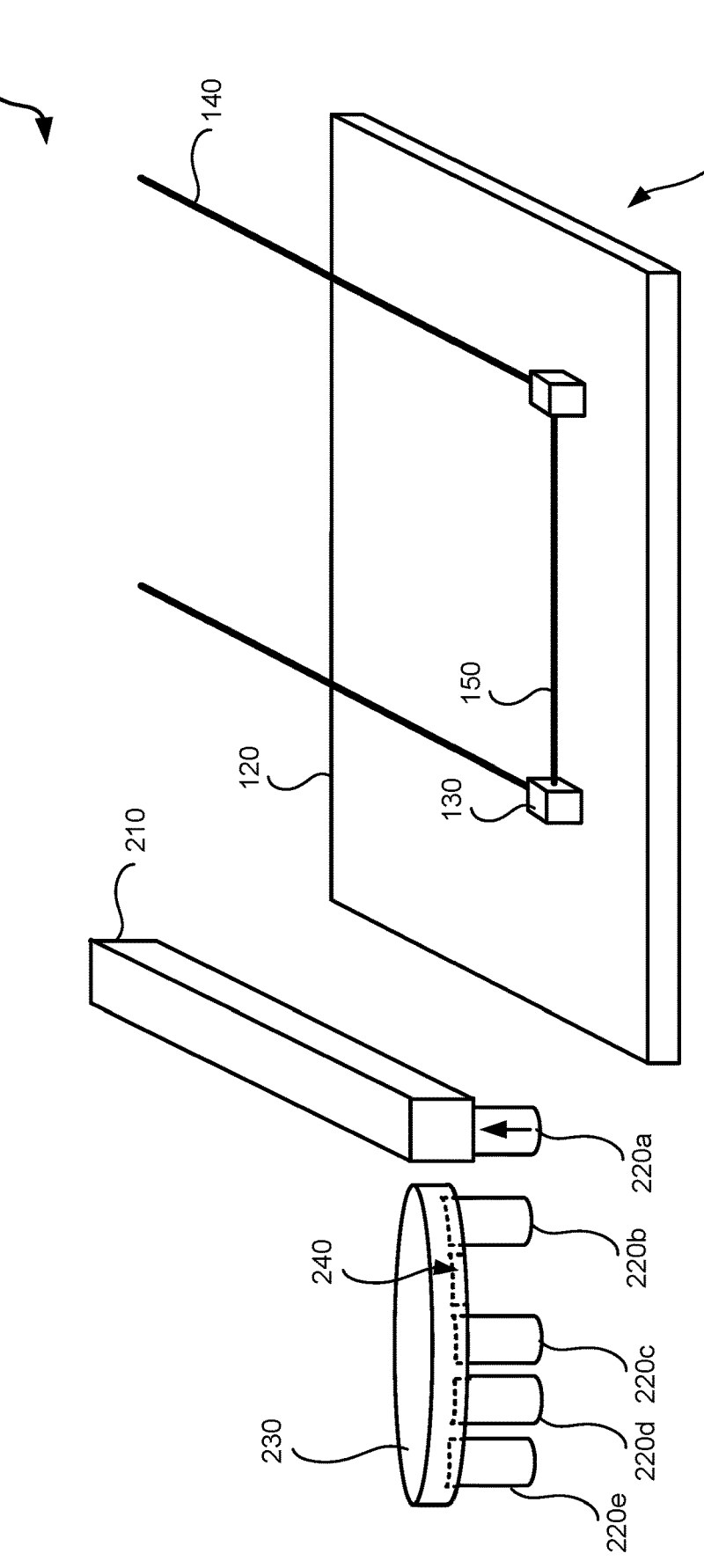
FIGS. 2B-2D illustrate an example of using an optical tool changer along with the motorized arm of FIG. 2A, in accordance with aspects of the disclosure.
Figure 2C:
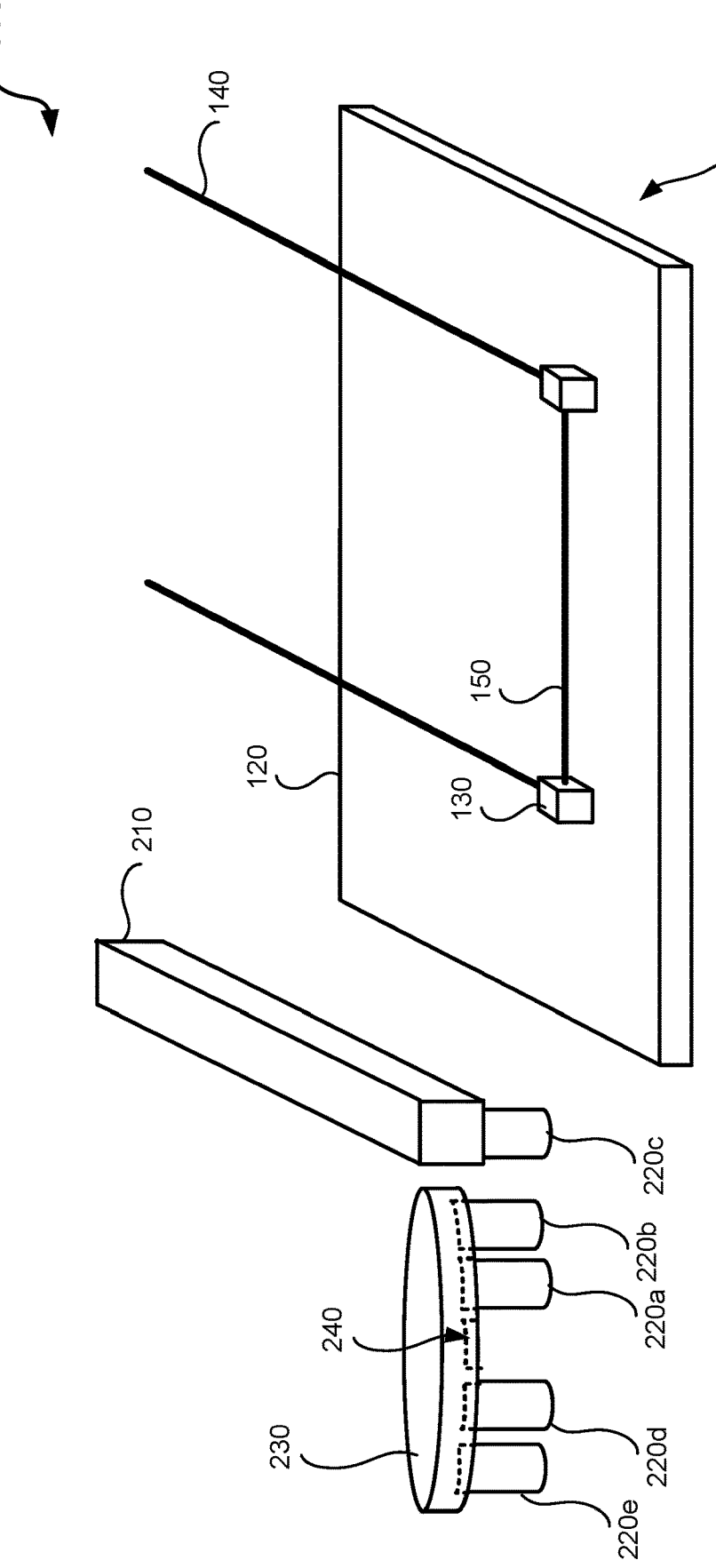
Figure 2D:
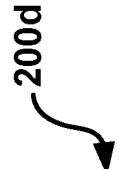
Figure 2D:
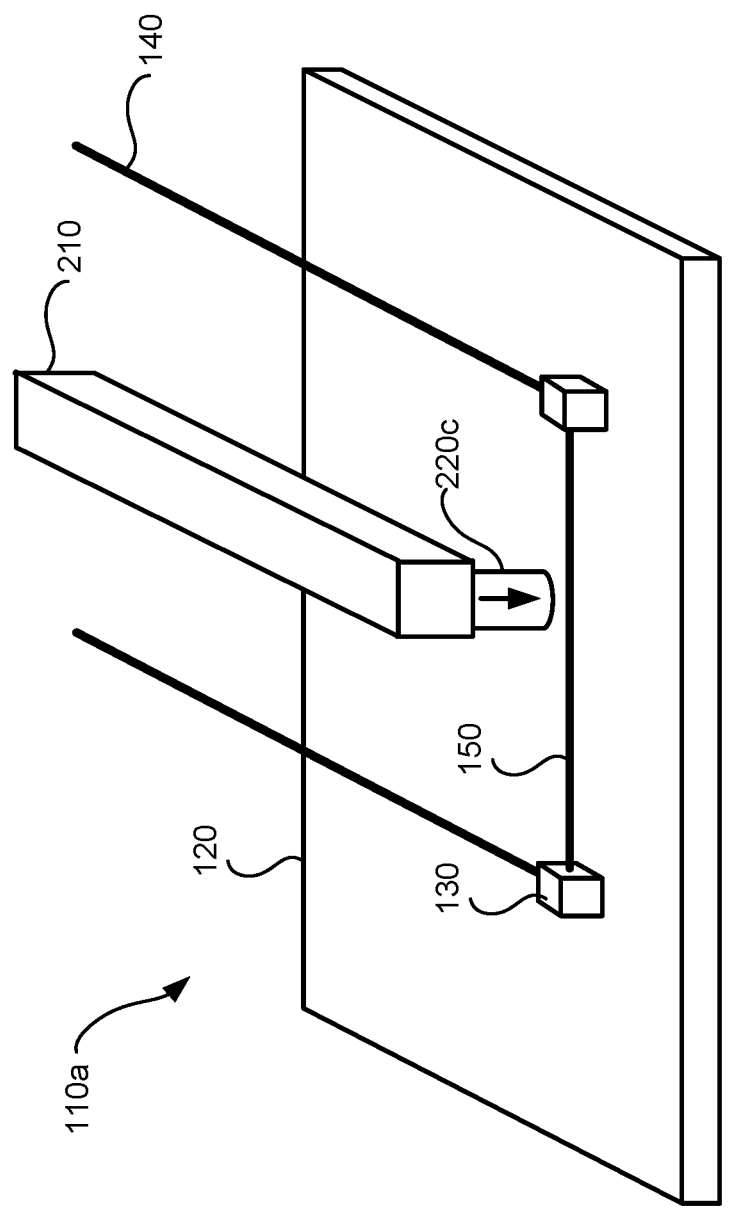

FIGS. 2B-2D show diagrams 200*b*-200*d* that illustrate the use of an optical tool changer 230 along with the arm 210 of the diagram 200*a* in FIG. 2A. In the diagram 200*b*, the arm 210 has been raised (e.g., upward arrow) after completion of a specified test or measurement using the optical tool 200*a*. In an example, the optical tool changer 230 can be located to the side of the optical assembly 110*a*. The arm 210 is then moved (e.g., via a motorized mechanism-not shown) towards the optical tool changer 230 to exchange the current optical tool, the optical tool 220*a*, for another optical tool to perform a different test on the optical assembly 110*a*.

The optical tool changer 230 can have multiple tool holders 240 for holding optical tools when not in use with the arm 210. As illustrated in the example in the diagram 200*b*, the optical tool changer 230 includes other optical tools, tools 220*b*, 220*c*, 220*d*, and 220*e*, that are held in their respective tool holders 240. The optical tool changer 230 shows an empty tool holder 240, where the optical tool 220*a* is placed when not in used by the arm 210.

The optical tool changer 230 is shown as a rotational device that spins or rotates in one direction or both directions to position an optical tool selected to perform the next specified test in the right place for attachment to the arm 210. Similarly, the optical tool changer 230 can spin or rotate to position the tool holder 240 that is to receive the current optical tool that is attached to the arm 210. In this case, the optical tool changer 230 rotates so that the tool holder 240 for the optical tool 220*a* is properly positioned for the optical tool 220*a* to be detached or removed from the arm 210 and placed in its corresponding tool holder.

In the diagram 200*c*, the optical tool 220*a* has been placed back in its corresponding tool holder 240 and a new optical tool, the optical tool 220*c*, has been attached to the arm 210, which is then moved to a position over the optical assembly 110*a* where the optical tool 220*c* will be used to perform a different test than the one previously performed by the optical tool 220*a*. In the diagram 200*d*, the arm 210 with the optical tool 220*c* is lowered (e.g., downward arrow) to perform a next test or measurement on the optical beam path 140.

A similar process as outlined above in connection with FIGS. 2A-2D can be used when performing a sequence of tests. For example, a sequence of tests may require the same optical tool to be used for consecutive tests in different places and the arm 210 may be moved accordingly without changing optical tools. Once a different test, and optical tool, is needed, then the arm 210 may move towards the optical tool changer 230 to exchange optical tools. In an example of a default setting, at the beginning or at the end of any single test or sequence of tests, the arm 210 may not have an optical tool attached.

Figure 3A:
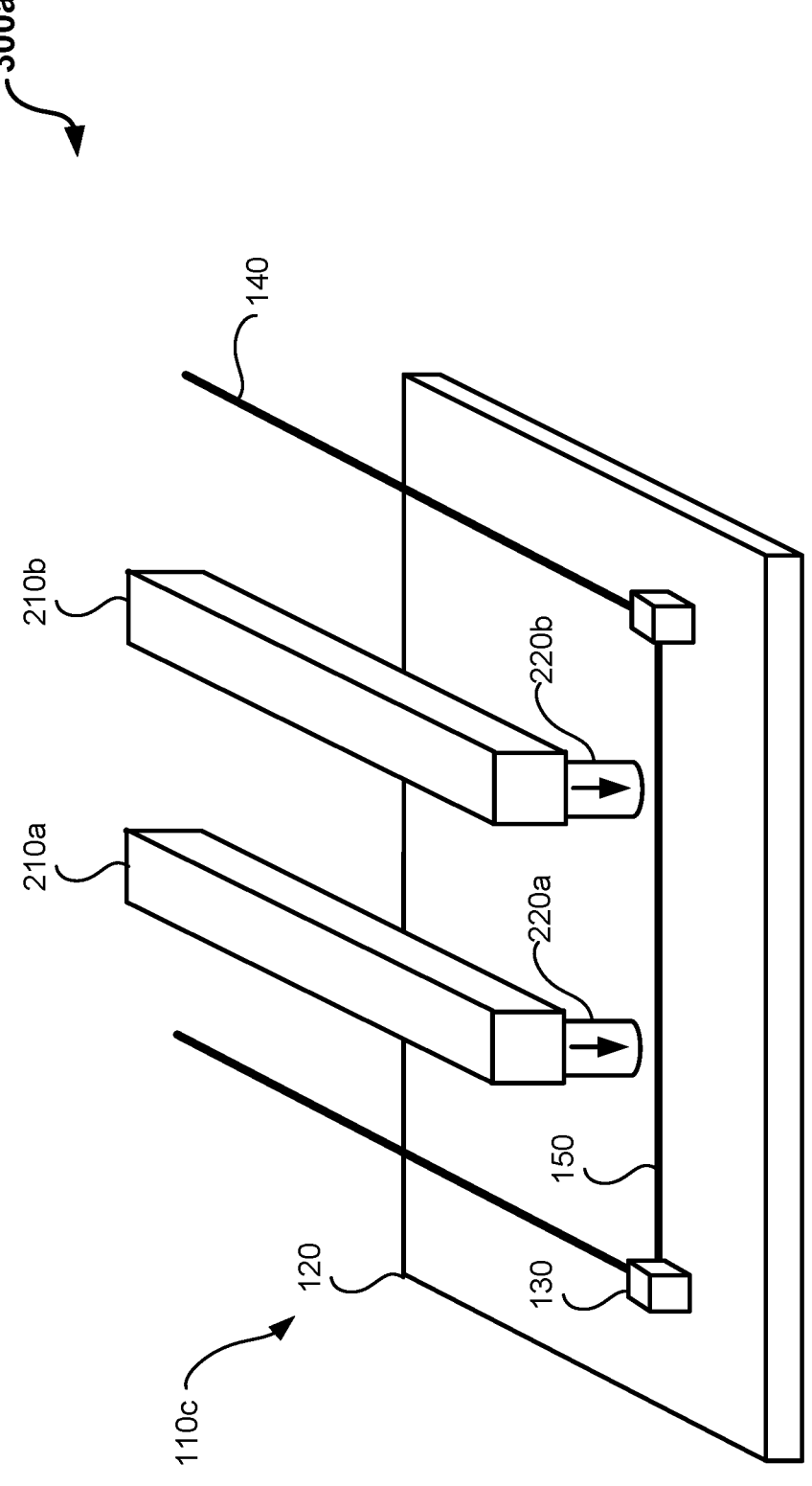
FIGS. 3A and 3B illustrate an example of an automated system for testing an optical assembly with multiple motorized arms, in accordance with aspects of the disclosure.
Figure 3B:
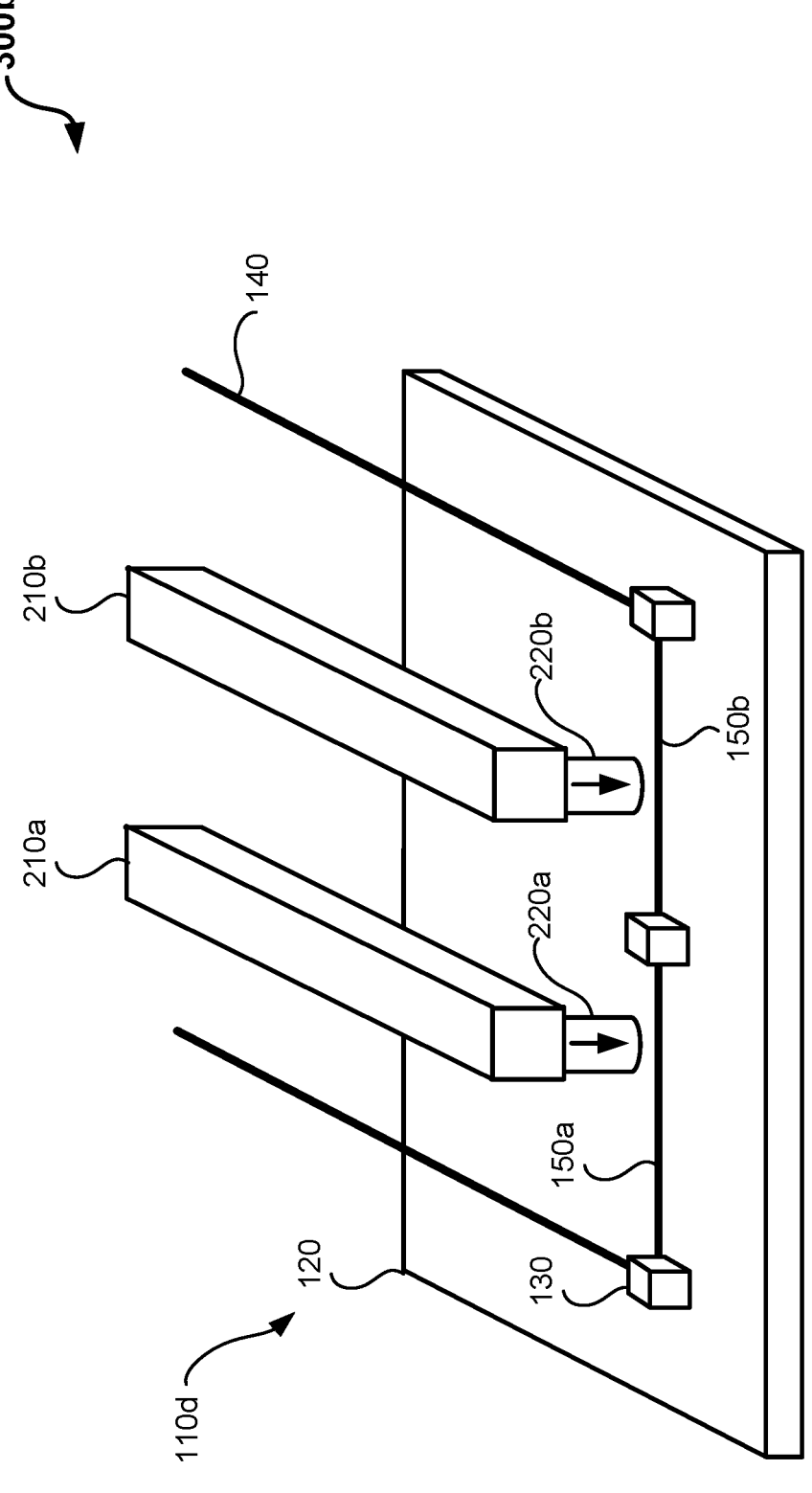

FIGS. 3A and 3B shows diagrams 300a and 300b, respectively, with examples of an automated system for testing an optical assembly with two or more motorized arms. In the example of the diagram 300a, the automated testing system can include two or more arms for testing an optical assembly 110c. In this case, a first arm 210a having the optical tool 220a and a second arm 210b having the optical tool 220b are used for testing. The arms 210a and 210b, with their respective optical tools, can be lowered (e.g., downward arrows) to the optical beam path 140 to perform different tests or to collectively perform a same test on an optical beam (e.g., jointly characterize an aspect or property of the optical beam) on the optical beam path 140 (or on a particular segment 150 of the optical beam path 140). When performing different tests, the tests can be performed concurrently or temporally offset from each other. When collectively performing the same test, at least some of the operations performed by the optical tools 220a and 220b in connection with the test are performed concurrently.

In the example of the diagram 300b, the first arm 210a having the optical tool 220a and the second arm 210b having the optical tool 220b are used for testing different segments (e.g., segments 150a, 150b) of the optical beam path 140 of an optical assembly 110d. The arms 210a and 210b, with their respective optical tools, can be lowered (e.g., downward arrows) to their respective segments of the optical beam path 140 to perform different tests, which can be performed concurrently or temporally offset from each other.

Figure 3C:
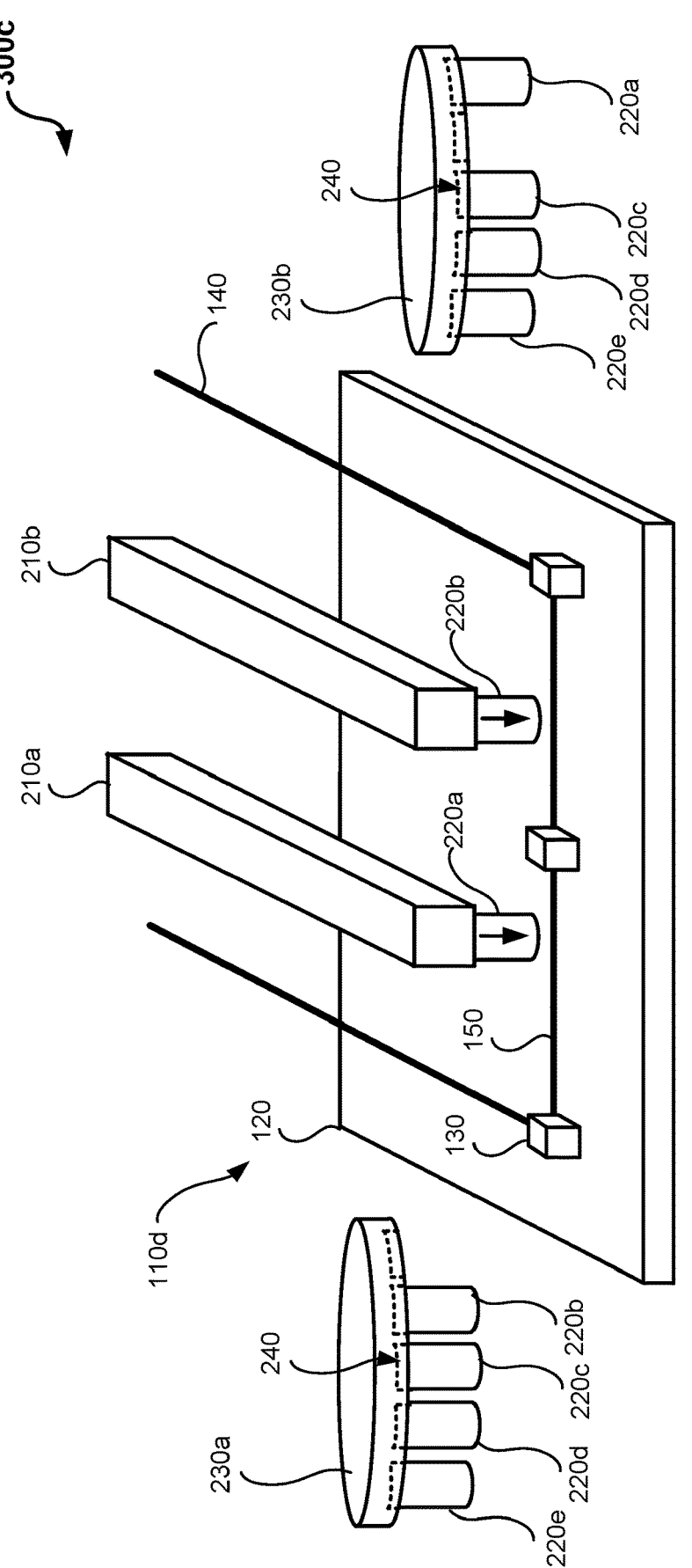
FIG. 3C illustrates an example of the automated system of FIGS. 3A and 3B with multiple optical tool changers, in accordance with aspects of the disclosure.

FIG. 3C shows a diagram 300c that illustrates an example of an automated testing system with multiple motorized arms and multiple optical tool changers. In this example, the automated testing system shown in the diagram 300b (e.g., with the optical assembly 110d) is shown for illustrative purposes. The first arm 210a having the optical tool 220a can obtain its optical tools from a first optical tool changer 230a, while the second arm 210b can obtain its optical tools from a second optical tool changer 230b. In one example, the set of optical tools in the first optical tool changer 230a can be the same as the set of optical tools in the second optical tool changer 230b. In such an example, the first arm 210 and the second arm 210b can be used to perform the same set of tests since they have access to the same optical tools. In another example, the set of optical tools in the first optical tool changer 230a can be different from the set of optical tools in the second optical tool changer 230b. In such an example, the first arm 210 and the second arm 210b can be used to perform the different tests since they have access to different optical tools.

Figure 4A:
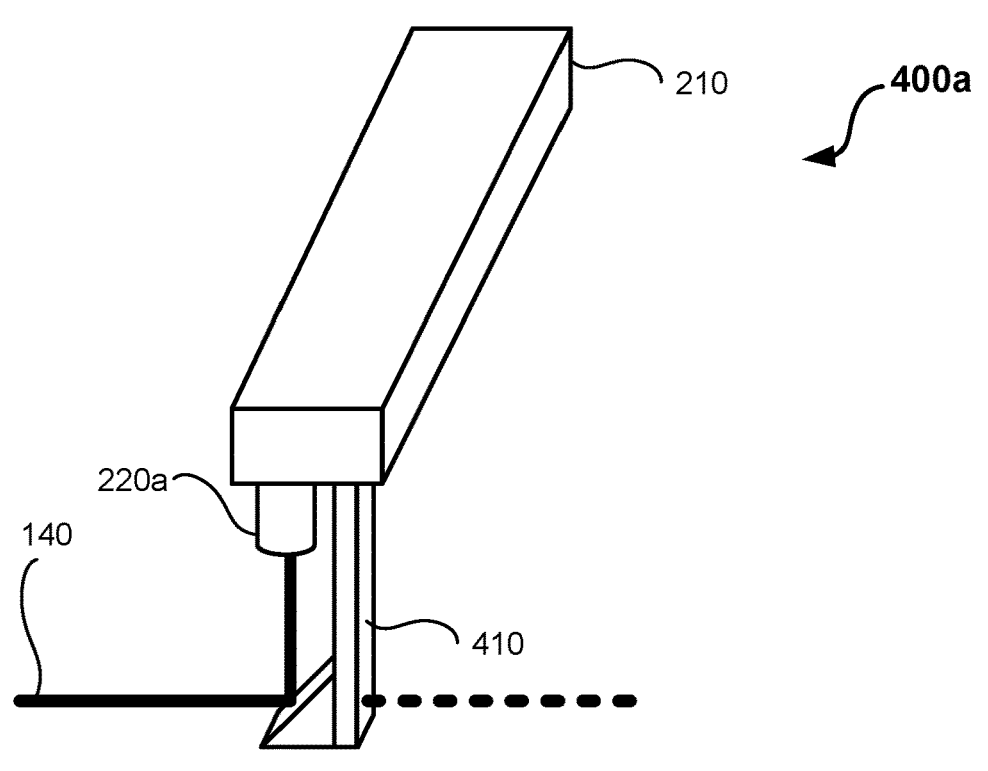
FIG. 4A illustrates an example of redirection optics to be used with optical tools, in accordance with aspects of the disclosure.

FIG. 4A shows a diagram 400a in which redirection optics 410 are attached to the optical tool 220a in the arm 210. The use of the redirection optics 410 allows for an optical beam in the optical beam path 140 and on the plane of an optical system formed on an optical assembly to be redirected vertically and towards the optical tool 220a. This approach may provide some flexibility and better access to certain testing points within narrow or limited spacing in the optical assembly.

Figure 4B:
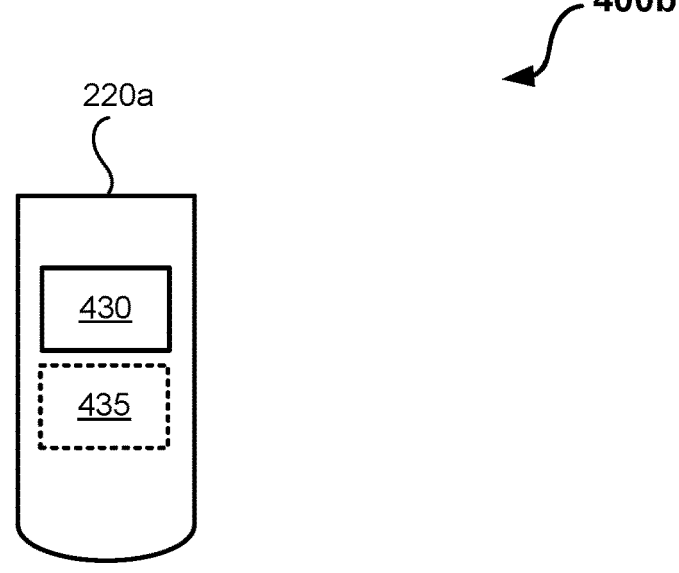
FIG. 4B illustrates an example of an optical tool with at least one measurement instrument, in accordance with aspects of the disclosure.

FIG. 4B shows a diagram 400b of the optical tool 220a having a first measurement instrument 430 configured to perform a specific or specified type of measurement. As described above, the measurement instrument can be or include an optical power meter, a CCD camera, a beam profiler, a rotating slit detector, and/or polarizing optics, as non-limiting examples. In some implementations, the optical tool 220a can be fitted with more than one measurement instrument. For example, in addition to the first measurement instrument 430, the optical tool 220a can also include a second measurement instrument 435 configured to perform a different test or measurement than that of the first measurement instrument 430.

A diagram 500 in FIG. 5 illustrates an example of a controller 510 used in an automated system for testing the optical assembly 110c. The controller 510 can include a processor 512 (e.g., a microcontroller or a central processing unit (CPU)) and a memory 514 that stores instructions for controlling the performance of one or more specified tests on the optical assembly 110c using the arm 210 and the optical tools 220a, 220b, 220c, 220d, and/or 220e in the optical tool changer 230.

The controller 510 may be configured to generate signals to control the operations of the arm 210, the optical tool attached to the arm 210, the optical tool changer 230, and one or more optical elements 130 on the optical assembly 110c. For example, the controller 510 may generate signals 515a to control the optical tool changer 230 such that any selected optical tool is made available to the arm 210 and that any optical tool attached to the arm 210 is placed back in its respective tool holder 240. When the optical tool changer 230 is a rotating device, the signals 515a may be used to control its rotation.

In another example, the controller 510 may generate signals 515b to control a mechanical or motorized device 520 that moves the arm 210 to move the arm 210 to a desirable location over the optical assembly 110c for testing or to interact with the optical tool changer 230. Moreover, the signals 515b may include instructions for the optical tool attached to the arm 210 to perform a specified test and send the results back to the controller 510 through the signals 515b.

The controller 510 may also generate signals 515c to control the positioning and alignment of one or more of the optical elements 130 on the optical assembly 110c. For example, as a result of the tests or measurements it is identified that a particular optical element 130 needs to be adjusted (see e.g., FIG. 1D), the controller 510 through the signals 515c may perform the adjustment. In one implementation, the adjustment of the particular optical element 130 can be performed while the optical tool is still positioned for testing such that a follow up test can be performed to determine whether the adjustment was successful or further adjustments may be needed.

Based on the description of FIGS. 1A-5 above, the present disclosure generally describes a system for automated characterization of an optical assembly (e.g., an automated testing or characterization system). The system can include an arm (e.g., the arm 210) configured to be positioned over the optical assembly (e.g., the optical assemblies 110a, 110b, 110c, or 110d), the optical assembly having a base plate (e.g., the base plate 120) with multiple optical elements (e.g., the optical elements 130) that form one or more optical beam paths (e.g., the optical beam path 140). The arm is a motorized arm configured to have six degrees of freedom by being able to be moved in three different directions and rotated in three different angles. Moreover, the optical assembly may be used in quantum information processing systems and the optical elements of the optical assembly may be configured or arranged to produce one or more optical beams to control ions in an ion trap used for quantum information processing.

The system can also include an optical tool (e.g., the optical tools 220a, 220b, 220c, 220d, and 220e) configured to be removably attached to the arm, the optical tool including a measurement instrument (e.g., the measurement instruments 430, 435) to perform a specified test on at least one of the one or more optical beam paths in the optical assembly, and the arm being configured to adjust its position over the optical assembly to move the optical tool to the correct place to perform the specified test. Being removably attached refers to the optical tool being able to be attached to the arm by engaging some mechanical means and then subsequently detached or removed from the arm by disengaging the mechanical means.

The system for automated characterization of the optical assembly may include or use redirection optics (e.g., the redirection optics 410) attached to the optical tool and configured to direct an optical beam from the at least one optical beam path on which the specified test is performed towards the measurement instrument in the optical tool. As mentioned above, the measurement instrument of the optical tool can be an optical power meter, and the specified test includes a characterization of an optical beam power. The measurement instrument of the optical tool can be a camera (e.g., CCD camera), and the specified test includes a characterization of an optical beam transverse profile. The measurement instrument of the optical tool can again be a camera, and the specified test includes a characterization of an optical beam position. The measurement instrument of the optical tool can be a beam profiler, and the specified test includes a characterization of optical beam properties including divergence, waist location, or both, and the characterization of the optical beam properties is performed by sampling an optical beam with the beam profiler at different points along a propagation direction of the optical beam. The measurement instrument of the optical tool can include polarizing optics, and the specified test includes a characterization of an optical beam polarization, where the polarizing optics can include waveplates, polarizing beam splitters, or both.

The system for automated characterization of the optical assembly may include an optical tool changer (e.g., the optical tool changer 230) configured to hold the optical tool in a tool holder when not attached to the arm and to hold one or more additional optical tools in respective tool holders when not attached to the arm, each of the optical tools held by the optical tool changer including a different measurement instrument to perform a different specified test. The optical tool changer can be configured to rotate to place the appropriate one of the optical tools it holds in a position for attachment to the arm. Moreover, the optical tool changer can be configured to rotate to place the appropriate one of the tool holders in a position for the arm to return the optical tool.

The system for automated characterization of the optical assembly may include a controller (e.g., the controller 510 with the processor 512 and the memory 514) configured to receive and process instructions associated with a sequences of tests, including the specified test, to be performed on the optical assembly, and to generate commands (e.g., signals) to perform the sequence of tests, including commands to adjust the position of the arm in accordance with the sequence of tests. The commands to perform the sequence of tests include commands (e.g., signals) to control operations of the measurement instrument in the optical tool and receive information resulting from performing the specified test.

The controller is further configured to process the information resulting from performing the specified test and generate commands (e.g., signals) to adjust one or more of the optical elements in the optical assembly to adjust the at least one optical beam path on which the specified test is performed.

The commands (e.g., signals) generated by the controller to perform the sequence of tests include commands to select one of the optical tools in the optical tool changer based on a current test in the sequence of tests, commands for the optical tool changer to rotate to place the selected one of the optical tools it holds in a position for attachment to the arm, and commands to rotate the optical tool changer to place the appropriate one of the tool holders in a position for the arm to return the selected optical tool.

The system for automated characterization of the optical assembly can be configured to have multiple arms (e.g., the first arm 210a and the second arm 210b) and/or multiple optical tool changers (e.g., the first optical tool changer 230a and the second optical tool changer 230b).

FIG. 6 is a flow chart that illustrates an example of a method 600 for automated characterization of an optical assembly.

The method 600 includes, at 610, selecting (e.g., by the controller 510) a current optical tool (e.g., the optical tool 220a) having a measurement instrument (e.g., the measurement instruments 340, 345) to perform a specified test on an optical beam path (e.g., the optical beam path 140) in the optical assembly (e.g., the optical assemblies 110a, 110b, 110c, and 110d).

The method 600 further includes, at 620, attaching the current optical tool to an arm (e.g., the arm 210) configured to be positioned over the optical assembly.

The method 600 further includes, at 630, adjusting a position of the arm over the optical assembly to move the optical tool to the optical beam path to perform the specified test.

The method 600 further includes, at 640, performing the specified test using the measurement instrument in the optical tool.

In another aspect of the method 600, performing the specified test includes generating test results by the measurement instrument and providing the test results for analysis. The method 600 may further include adjusting one or more optical elements (e.g., the optical elements 130) associated with the optical beam path in response to the analysis of the test results.

In another aspect of the method 600, selecting the current optical tool includes selecting the current optical tool from multiple optical tools held by an optical tool changer (e.g., the optical tool changer 230), each of the multiple optical tools being held in a separate tool holder (e.g., the tool holder 240) and having a different measurement instrument to perform a different specified test. The method 600 may further include returning the current optical tool to a respective tool holder in the optical tool changer. Moreover, the method 600 may further include selecting a next optical tool having a different measurement instrument to perform a different specified test, attaching the next optical tool to the arm, adjusting a position of the arm over the optical assembly to move the next optical tool to the optical beam path or to a different optical beam path to perform the next specified test, and performing the next specified test using the different measurement instrument in the next optical tool.

In another aspect of the method 600, the method 600 may additionally include generating, from a CAD model associated with a design of the optical assembly, a testing procedure that includes the specified test, where the CAD model provides a three-dimensional mapping or topography of the optical assembly. The testing procedure generated from the CAD model includes a sequence of tests for the optical assembly, where the sequence of tests includes the specified test. The testing procedure generated from the CAD model includes instructions for selecting the current optical tool for the specified test, for attaching the current optical tool to the arm, for adjusting the position of the arm over the optical assembly, and for performing the specified test using the measurement instrument in the optical tool. The instructions for performing the specified test using the measurement instrument in the optical tool include instructions about which parameters to characterize using the measurement instrument (e.g., the optical beam transverse profile, the optical beam position, etc.). Moreover, the method 600 may include storing instructions associated with the testing procedure in a memory (e.g., the memory 514 in the controller 510), and executing the instructions in a processor (e.g., the processor 512 in the controller 510) to generate commands (e.g., control signals) that control at least one of an optical tool changer configured to hold the optical tool, the optical tool, the measurement instrument in the optical tool, and the arm.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A system for automated characterization of an optical assembly, comprising:
   an arm configured to be coupled to the optical assembly that includes multiple optical elements configured to form one or more optical beam paths;
   an optical tool configured to be removably attached to the arm, the optical tool including a measurement instrument configured to perform a measurement, and
   an optical tool changer configured to hold the optical tool in a tool holder when not attached to the arm and to hold one or more additional optical tools in respective tool holders when not attached to the arm, each of the one or more additional optical tools held by the optical tool changer including a different measurement instrument to perform a different measurement;
   wherein the arm is configured to move the optical tool over the optical assembly to a location associated with performing the measurement.

2. The system of claim 1, further comprising redirection optics attached to the optical tool and configured to direct an optical beam from at least one optical beam path on which the measurement is performed towards the measurement instrument in the optical tool.

3. The system of claim 1, wherein the measurement instrument of the optical tool is an optical power meter, and the measurement includes a characterization of an optical beam power.

4. The system of claim 1, wherein the measurement instrument of the optical tool is a camera, and the measurement includes a characterization of an optical beam transverse profile.

5. The system of claim 1, wherein the measurement instrument of the optical tool is a camera or a position-sensitive photodetector, and the measurement includes a characterization of an optical beam position.

6. The system of claim 1, wherein the measurement instrument of the optical tool is a beam profiler, and the measurement includes a characterization of optical beam properties including divergence, waist location, or both.

7. The system of claim 6, wherein the characterization of the optical beam properties is performed by sampling an optical beam with the beam profiler at different points along a propagation direction of the optical beam.

8. The system of claim 1, wherein the measurement instrument of the optical tool includes polarizing optics, and the measurement includes a characterization of an optical beam polarization.

9. The system of claim 8, wherein the polarizing optics include waveplates, polarizing beam splitters, or both.

10. The system of claim 1, wherein the optical tool changer is configured to rotate to place an appropriate one of the one or more additional optical tools that the optical tool changer holds in a position for attachment to the arm.

11. The system of claim 1, wherein the optical tool changer is configured to rotate to place an appropriate tool holder in a position for the arm to return the optical tool.

12. The system of claim 1, further comprising a controller configured to receive and process instructions associated with a sequence of measurements, including the measurement, to be performed on the optical assembly, and to generate commands to perform the sequence of measurements, including commands to adjust a position of the arm in accordance with the sequence of measurements.

13. The system of claim 12, wherein the commands to perform the sequence of measurements include commands to control operations of the measurement instrument in the optical tool and receive information resulting from performing the measurement.

14. The system of claim 12, wherein the controller is further configured to process information resulting from performing the measurement and generate commands to adjust one or more of the multiple optical elements in the optical assembly to adjust at least one optical beam path on which the measurement is performed.

15. The system of claim 12,
   wherein the commands to perform the sequence of measurements include:
      commands to select one of the one or more additional optical tools in the optical tool changer based on a current test in the sequence of measurements,
      commands for the optical tool changer to rotate to place the selected optical tool that the optical tool changer holds in a position for attachment to the arm, and
      commands to rotate the optical tool changer to place an appropriate tool holder in a position for the arm to return the selected optical tool.

16. The system of claim 1, wherein the arm is a motorized arm configured to have up to six degrees-of-freedom by being able to be moved in up to three different directions and rotated in up to three different angles.

17. A system for automated characterization of an optical assembly, comprising:
   a first arm configured to be coupled to the optical assembly that includes a base plate with multiple optical elements configured to form one or more optical beam paths;
   a first optical tool configured to be removably attached to the first arm, the first optical tool including a first measurement instrument configured to perform a first measurement and the first arm being configured to adjust a position of the first optical tool over the optical assembly to move the first optical tool to a first location associated with performing the first measurement;

a second arm configured to be positioned over the optical assembly; and a second optical tool configured to be removably attached to the second arm, the second optical tool including a second measurement instrument to perform a second measurement along at least one of the one or more optical beam paths in the optical assembly, the second arm being configured to adjust a position of the second optical tool over the optical assembly to move the second optical tool to a second location associated with performing the second measurement, wherein at least one optical beam path among the one or more optical beam paths is a same optical beam path for the first measurement and the second measurement such that the first measurement is related to the second measurement to jointly characterize an aspect of the at least one optical beam path.

18. The system of claim 17, wherein the multiple optical elements of the optical assembly are configured to produce one or more optical beams to control ions in an ion trap used for quantum information processing.

* * * * *